(12) United States Patent
Li et al.

(10) Patent No.: US 12,706,739 B2
(45) Date of Patent: Aug. 11, 2026

(54) METHOD, APPARATUS, DEVICE AND MEDIUM FOR PROCESSING GENETIC DATA

(71) Applicant: Douyin Vision (Beijing) Co., Ltd., Beijing (CN)

(72) Inventors: Xiaoguang Li, Beijing (CN); Ledian Liu, Beijing (CN); Bing Duan, Beijing (CN); Fan Lin, Beijing (CN)

(73) Assignee: Douyin Vision (Beijing) Co., Ltd., Beijing (CN)

( * ) Notice: Subject to any disclaimer, the term of this patent is extended or adjusted under 35 U.S.C. 154(b) by 176 days.

(21) Appl. No.: 18/839,265

(22) PCT Filed: Jun. 7, 2023

(86) PCT No.: PCT/CN2023/098840
§ 371 (c)(1),
(2) Date: Aug. 16, 2024

(87) PCT Pub. No.: WO2023/246509
PCT Pub. Date: Dec. 28, 2023

(65) Prior Publication Data

US 2025/0167985 A1 May 22, 2025

(30) Foreign Application Priority Data

Jun. 22, 2022 (CN) ......................... 202210715473.4

(51) Int. Cl.
*H04L 9/08* (2006.01)
*H04L 9/32* (2006.01)

(52) U.S. Cl.
CPC .......... *H04L 9/0838* (2013.01); *H04L 9/3268* (2013.01)

(58) Field of Classification Search
CPC ....... H04L 9/0838; H04L 9/3268; H04L 9/08; H04L 9/3263; H04L 63/0428; H04L 63/0823; H04L 63/083
See application file for complete search history.

(56) References Cited

U.S. PATENT DOCUMENTS

2016/0254904 A1 9/2016 Hjelm et al.
2018/0183772 A1 6/2018 Jeon et al.
(Continued)

FOREIGN PATENT DOCUMENTS

CN 105408913 A 3/2016
CN 105790938 A 7/2016
(Continued)

OTHER PUBLICATIONS

Office action received from Chinese patent application No. 202210715473.4 mailed on Mar. 29, 2024, 15 pages (6 pages English Translation and 9 pages Original Copy).
(Continued)

*Primary Examiner* — Huan V Doan

(57) ABSTRACT

Methods, apparatuses, devices, and media are provided for processing genetic data. In a method, in a normal execution environment in a data processing system, ciphertext of genetic data is received from a data providing system via a public channel between the normal execution environment and the data providing system. In a trusted execution environment in the data processing system, a key for decrypting the ciphertext of the genetic data is received from the data providing system via a secure channel between the trusted execution environment and the data providing system. In the trusted execution environment, the ciphertext of the genetic data is decrypted using the key to obtain plaintext of the genetic data. In the trusted execution environment, the plaintext of the genetic data is processed to determine a
(Continued)

600

610 RECEIVE, IN A NORMAL EXECUTION ENVIRONMENT IN A DATA PROCESSING SYSTEM, CIPHERTEXT OF GENETIC DATA FROM A DATA PROVIDING SYSTEM VIA A PUBLIC CHANNEL BETWEEN THE NORMAL EXECUTION ENVIRONMENT AND THE DATA PROVIDING SYSTEM

620 IN A TRUSTED EXECUTION ENVIRONMENT IN THE DATA PROCESSING SYSTEM, RECEIVE, A KEY FOR DECRYPTING THE CIPHERTEXT OF THE GENETIC DATA, FROM THE DATA PROVIDING SYSTEM VIA A SECURE CHANNEL BETWEEN THE TRUSTED EXECUTION ENVIRONMENT AND THE DATA PROVIDING SYSTEM

630 IN THE TRUSTED EXECUTION ENVIRONMENT, DECRYPT THE CIPHERTEXT OF THE GENETIC DATA USING THE KEY TO OBTAIN PLAINTEXT OF THE GENETIC DATA

640 IN THE TRUSTED EXECUTION ENVIRONMENT, PROCESS THE PLAINTEXT OF THE GENETIC DATA TO DETERMINE A PROCESSING RESULT OF THE GENETIC DATA processing result of the genetic data. The genetic data may be processed in a safe and reliable trusted execution environment.

17 Claims, 5 Drawing Sheets

(56) References Cited

U.S. PATENT DOCUMENTS

| | | | | |
|---|---|---|---|---|
| 2019/0279221 | A1 | 9/2019 | Wang et al. | |
| 2021/0111901 | A1* | 4/2021 | Ibrahim | G06F 21/72 |
| 2023/0032363 | A1* | 2/2023 | Huo | G06F 21/602 |

FOREIGN PATENT DOCUMENTS

| | | | |
|---|---|---|---|
| CN | 106897584 | A | 6/2017 |
| CN | 106936774 | A | 7/2017 |
| CN | 107315970 | A | 11/2017 |
| CN | 108063752 | A | 5/2018 |
| CN | 109150548 | A | 1/2019 |
| CN | 110162981 | A | 8/2019 |
| CN | 110535628 | A | 12/2019 |
| CN | 111125736 | A | 5/2020 |
| CN | 111753312 | A | 10/2020 |
| CN | 112438034 | A | 3/2021 |
| CN | 112688999 | A | 4/2021 |
| CN | 113542303 | A | 10/2021 |
| CN | 113918906 | A | 1/2022 |
| CN | 114297692 | A | 4/2022 |
| CN | 115277078 | A | 11/2022 |
| EP | 2759955 | A1 | 7/2014 |
| EP | 3036680 | A1 | 6/2016 |

OTHER PUBLICATIONS

Office action received from Chinese patent application No. 202210715473.4 mailed on Aug. 30, 2024, 15 pages (8 pages English Translation and 7 pages Original Copy).

* cited by examiner

METHOD, APPARATUS, DEVICE AND MEDIUM FOR PROCESSING GENETIC DATA

This application claims priority to Chinese Patent Application No. 202210715473.4, filed Jun. 22, 2022, entitled "METHOD, APPARATUS, DEVICE AND MEDIUM FOR PROCESSING GENETIC DATA".

FIELD

Example implementations of the present disclosure generally relate to data processing, and more particularly to methods, apparatuses, devices, and computer-readable storage media for processing genetic data.

BACKGROUND

With the development of genetic technology, genetic data have been collected and processed at present. Genetic data processing is involved in various fields such as biology, medicine and the like. It will be appreciated that genetic data may comprise various sensitive information, which requires that the safety and integrity of genetic data should be maintained during genetic data processing. At this time, how to process genetic data in a safer and effective manner becomes a difficult point and hot spot in the field of genetic data processing.

SUMMARY

In a first aspect of the present disclosure, a method for processing genetic data is provided. In the method, in a normal execution environment in a data processing system, ciphertext of genetic data is received from a data providing system via a public channel between the normal execution environment and the data providing system. In a trusted execution environment in the data processing system, a key for decrypting the ciphertext of the genetic data is received from the data providing system via a secure channel between the trusted execution environment and the data providing system. In the trusted execution environment, the ciphertext of the genetic data is decrypted using the key to obtain plaintext of the genetic data. In the trusted execution environment, the plaintext of the genetic data is processed to determine a processing result of the genetic data.

In a second aspect of the present disclosure, an apparatus for processing genetic data is provided. The apparatus comprises: a data receiving module, configured for receiving, in a normal execution environment in a data processing system, ciphertext of genetic data from a data providing system via a public channel between the normal execution environment and the data providing system; a key receiving module, configured for in a trusted execution environment in the data processing system, receiving, a key for decrypting the ciphertext of the genetic data, from the data providing system via a secure channel between the trusted execution environment and the data providing system; an obtaining module, configured for decrypting, in the trusted execution environment, the ciphertext of the genetic data using the key to obtain plaintext of the genetic data; and a processing module, configured for processing, in the trusted execution environment, the plaintext of the genetic data to determine a processing result of the genetic data.

In a third aspect of the present disclosure, an electronic device is provided. The electronic device comprises: at least one processing unit; and at least one memory coupled to the at least one processing unit and storing instructions for execution by the at least one processing unit, the instructions, when executed by the at least one processing unit, causing the electronic device to perform the method according to the first aspect of the present disclosure.

In a fourth aspect of the present disclosure, there is provided a computer-readable storage medium having stored there on a computer program which, when executed by a processor, causes the processor to implement the method according to the first aspect of the present disclosure.

It should be understood that the content described in the summary of the present disclosure is not intended to limit the key features or important features of the implementations of the present disclosure, nor is it intended to limit the scope of the present disclosure. Other features of the present disclosure will become readily understood from the following description.

BRIEF DESCRIPTION OF DRAWINGS

The above and other features, advantages, and aspects of the various implementations of the present disclosure will become more apparent from the following detailed description taken in conjunction with the accompanying drawings. In the drawings, the same or similar reference numbers refer to the same or similar elements, wherein.

DETAILED DESCRIPTION

Figure 1:
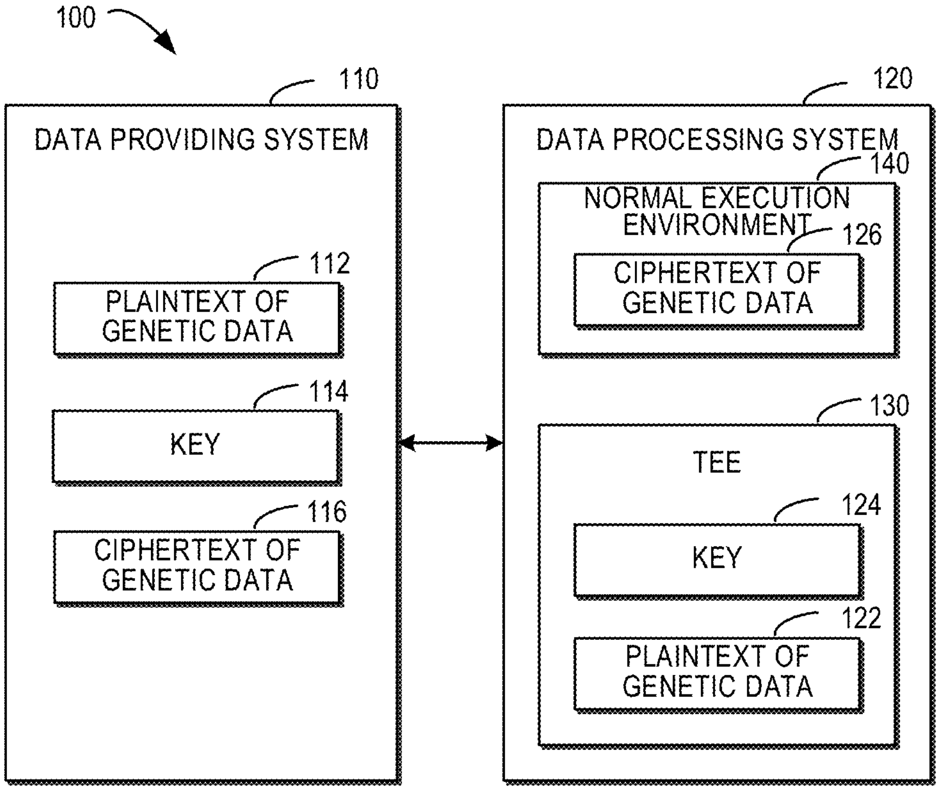
FIG. 1 illustrates a block diagram of an example environment in which implementations of the present disclosure may be implemented.

The implementations of the present disclosure will be described in more detail with reference to the accompanying drawings, in which some implementations of the present disclosure have been illustrated. However, it should be understood that the present disclosure may be implemented in various manners, and thus should not be construed to be limited to implementations disclosed herein. On the contrary, those implementations are provided for the thorough and complete understanding of the present disclosure. It should be understood that the drawings and implementations of the present disclosure are only used for illustration, rather than limiting the protection scope of the present disclosure.

As used herein, the term "comprise" and its variants are to be read as open terms that mean "include, but is not limited to." The term "based on" is to be read as "based at least in part on." The term "one implementation" or "the implementation" is to be read as "at least one implementation." The term "some implementations" is to be read as "at least some implementations." Other definitions, explicit and implicit, might be further included below. As used herein, the term "model" may represent associations between respective data. For example, the above association may be obtained based on various technical solutions that are currently known and/or to be developed in future.

It is to be understood that the data involved in this technical solution (including but not limited to the data itself, data acquisition or use) should comply with the requirements of corresponding laws and regulations and relevant provisions.

It is to be understood that, before applying the technical solutions disclosed in respective embodiments of the present disclosure, the user should be informed of the type, scope of use, and use scenario of the personal information involved in the present disclosure in an appropriate manner in accordance with relevant laws and regulations, and user authorization should be obtained.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that perform operations of the technical solutions of the present disclosure.

As an optional but non-limiting implementation, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the implementations of the present disclosure. Other methods that satisfy relevant laws and regulations are also applicable to the implementations of the present disclosure.

Example Environment

With the development of genetic technology, various treatments may be performed on genetic data. For example, in the field of plant research, genetic data may be analyzed to find genetic fragments related to potential plant diseases and pests of a plant, and so on. In the context of the present disclosure, the type of genetic data is not limited, and the specific treatment process performed on the genetic data is not limited, but the desired treatment process may be performed on the genetic data of various organisms according to requirements of a specific application environment.

At present, a technical solution for protecting the security of genetic data has been proposed. For example, a process such as detection, storage, sharing, and processing of genetic data may be implemented based on a blockchain and a proxy re-encryption technology. Specifically, the operation may be performed in the blockchain in a form of a smart contract, so as to ensure the security and integrity of the genetic data. However, the technical solution may only provide a lower degree of data security measure, and an organization (for example, an organization for performing genetic data analysis) other than the data provider that is authorized to access the genetic data may still obtain sensitive genetic data, and thus complete confidentiality are not achieved. For another example, the genetic data may be processed based on a privacy protection intersection calculation protocol. However, the technical solution is applicable only to a single calculation task of privacy protection intersection, and cannot perform corresponding processing according to a specific target of the genetic data provider. At this time, how to process genetic data in a safer and effective manner becomes a difficult point and hot spot in the field of genetic processing.

Summary of Genetic Data Processing

In order to remove drawbacks in the foregoing technical solutions, according to an example implementation of the present disclosure, there is provided a technical solution of processing genetic data in a trusted execution environment (TEE). Here, the trusted execution environment may build a secure enclave in the data processing system in a software and/or hardware manner, and ensure the security and integrity of programs and data loaded into the secure enclave. With the development of computer technology, the available storage space of the current trusted execution environment has been greatly improved, for example, it has reached the order of terabytes (TB) or even higher.

A basic principle of a trusted execution environment is to divide resources of a data processing system into two execution environments: a trusted execution environment and a normal execution environment. The two environments are securely isolated and have independent internal data paths and storage space. Applications in a normal execution environment cannot access any content within the trusted execution environment, and even within the trusted execution environment, the execution of multiple applications may be independent of each other and cannot be mutually accessed without authorization.

Referring to FIG. 1 to describe an application environment according to an example implementation of the present disclosure, and FIG. 1 shows a block diagram of an example environment 100 in which implementations of the present disclosure may be implemented. As shown in FIG. 1, the data providing system 110 may send the genetic data to the data processing system 120 in a ciphertext format and request processing of the genetic data by the data processing system 120. Here, the data providing system 110 may be a system of an owner of genetic data, such as a system of a genetic sequencing entity or a system that delegates entities performing genetic sequencing. The data processing system 120 may be a system for providing data processing services, such as a scientific research institution, and the like.

The data providing system 110 may have the plaintext 112 of genetic data. Further, in the data providing system 110, the plaintext 112 of the genetic data may be encrypted by using the key 114, so as to obtain the ciphertext 116 of the genetic data. The ciphertext 116 of genetic data may be sent to data processing system 120, e.g., may be transmitted via a public channel between data providing system 110 and data processing system 120. Since the genetic data is transmitted in a ciphertext format, even if a third party acquires the ciphertext, the ciphertext cannot be decrypted.

The ciphertext 126 of genetic data may be received in a normal execution environment 140 in data processing system 120. Further, a secure connection may be established between the data providing system 110 and the trusted execution environment 130, so as to transmit the key 114 from the data providing system 110 to the trusted execution environment 130, and then obtain the corresponding key 124 in the trusted execution environment 130. Further, the ciphertext 126 of the genetic data may be loaded from the normal execution environment 140 to the trusted execution environment 130, and the ciphertext may be decrypted by using the key 124 in the trusted execution environment 130 to obtain the plaintext 122 of the genetic data.

It will be appreciated that the data within the trusted execution environment 130 is secure and confidential, and nobody can steal the key 124 and the plaintext 122 of the genetic data from the trusted execution environment 130. At this point, it may be ensured that the plaintext 122 of the genetic data exists only in the trusted execution environment 130, even the provider of the data processing system 120 cannot access the plaintext data in the trusted execution environment 130. In this way, the processing capability of the data processing system 120 may be invoked to obtain the desired processing result while ensuring the security of the plaintext 122 of the genetic data.

Detail of Genetic Data Processing

Figure 2:
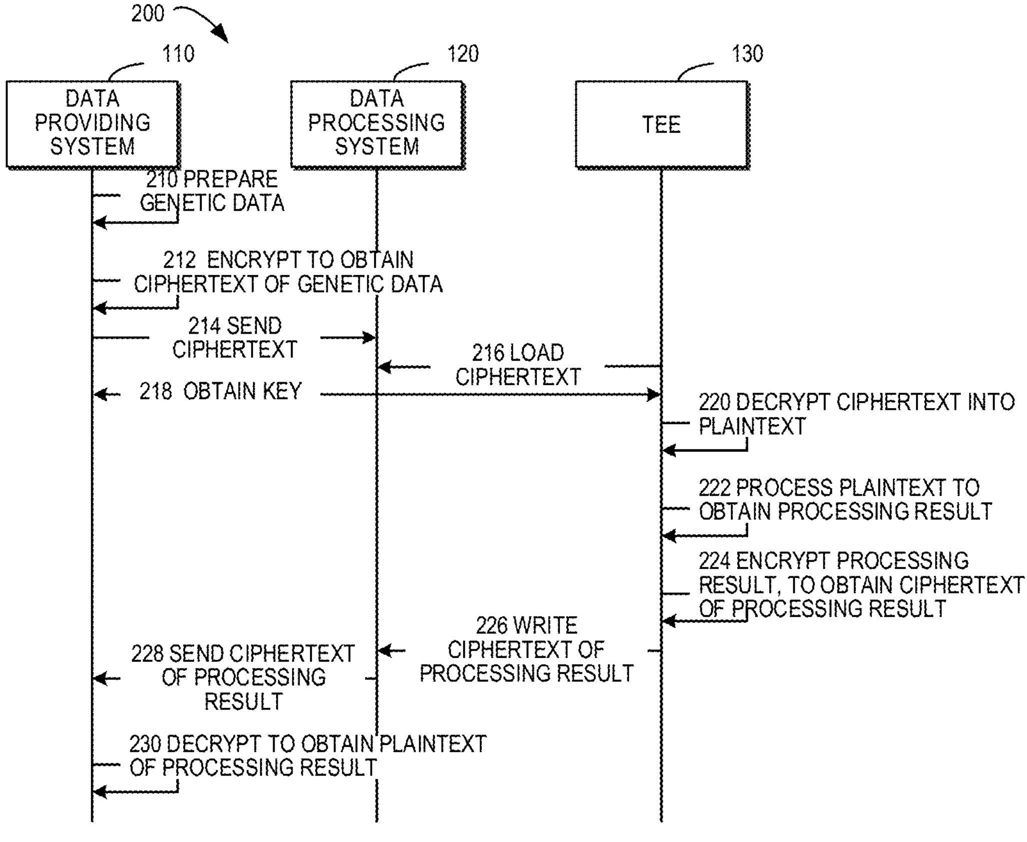
FIG. 2 illustrates a pipeline diagram of a process for processing genetic data according to some implementations of the present disclosure.

In the following, further details according to an example implementation of the present disclosure will be described with reference to FIG. 2. FIG. 2 shows a pipeline diagram 200 of a process for processing genetic data according to some implementations of the present disclosure. FIG. 2 illustrates an interaction process between data providing system 110, data processing system 120, and trusted execution environment 130 in data processing system 120. The data providing system 110 may prepare (210) the genetic data, e.g., genetic data collect via a dedicated device may be stored in a storage device of the data providing system 110. It will be appreciated that although the genetic data is stored in a plaintext format in the data providing system 110, since the data providing system 110 is the system of the genetic data owner, storing the genetic data in plaintext may not result in data leakage.

Next, the data providing system 110 may encrypt the plaintext 112 of the genetic data in various ways. According to an example implementation of the present disclosure, the ciphertext 116 of the genetic data may be obtained (212) using a symmetric encryption algorithm and using the key 114. It will be understood that usually the data amount of the genetic data is large, and since the processing speed of the symmetric encryption algorithm is fast and thus is suitable for processing a large data amount, a symmetric encryption algorithm may be used to generate the ciphertext 116 of the genetic data. Specifically, the data providing system 110 may dynamically generate the key 112 based on an Advanced Encryption Standard (AES), and perform an encryption process.

Figure 3:
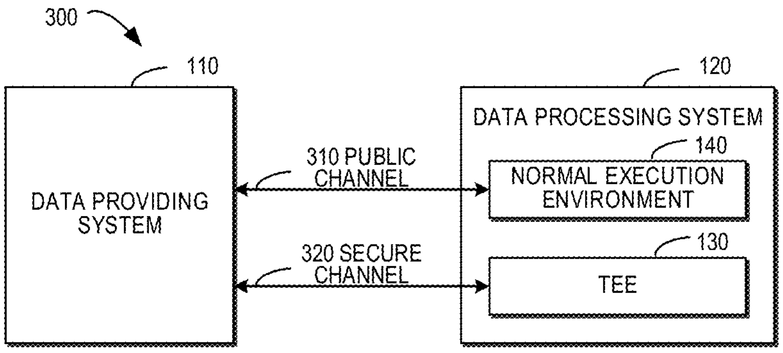
FIG. 3 illustrates a block diagram of a channel between a data providing system and a data processing system according to some implementations of the present disclosure.

Further, the ciphertext 116 of the genetic data may be sent (214) to the data processing system 120 via the public channel. Since the genetic data is sent in the ciphertext format, sending the ciphertext in the public channel does not result in genetic data leakage. Hereinafter, a communication channel between the data providing system 110 and the data processing system 120 is described with reference to FIG. 3. FIG. 3 illustrates a block diagram 300 of a channel between the data providing system 110 and the data processing system 120 in accordance with some implementations of the present disclosure. As shown in FIG. 3, there may be a public channel 310 and a secure channel 320 between the data providing system 110 and the data processing system 120. Here, the public channel 310 is between the data providing system 110 and the normal execution environment 140 of the data processing system 120, for transmitting ciphertext 116 of the genetic data and the ciphertext of the processing result acquired by the data processing system 120. The secure channel 320 may be used to transmit various data related to key exchange.

According to one example implementation of the present disclosure, a Remote Procedure Call (abbreviated as RPC) may be utilized to establish the public channel 310 (e.g., via gRPC) between the data providing system 110 and the normal execution environment 140 for sending the ciphertext 116 of the genetic data. Returning to FIG. 2, the data providing system 110 may send the ciphertext via the public channel 310. Further, the trusted execution environment 130 may load (216) the ciphertext 112 of the genetic data from the normal execution environment 140 of the data processing system 120, at which point the ciphertext 112 of the genetic data is stored in the trusted execution environment 130, and the trusted execution environment 130 also needs to acquire the key 114 to perform the decryption operation.

According to an example implementation of the present disclosure, since the genetic data is usually large, the genetic data may be loaded into the trusted execution environment 130 in a batch manner. For example, the data providing system 110 may determine a batch policy of the genetic data based on the configuration parameters of the trusted execution environment, and divide the genetic data into batches suitable for loading into the genetic data in the trusted execution environment 130.

Figure 4:
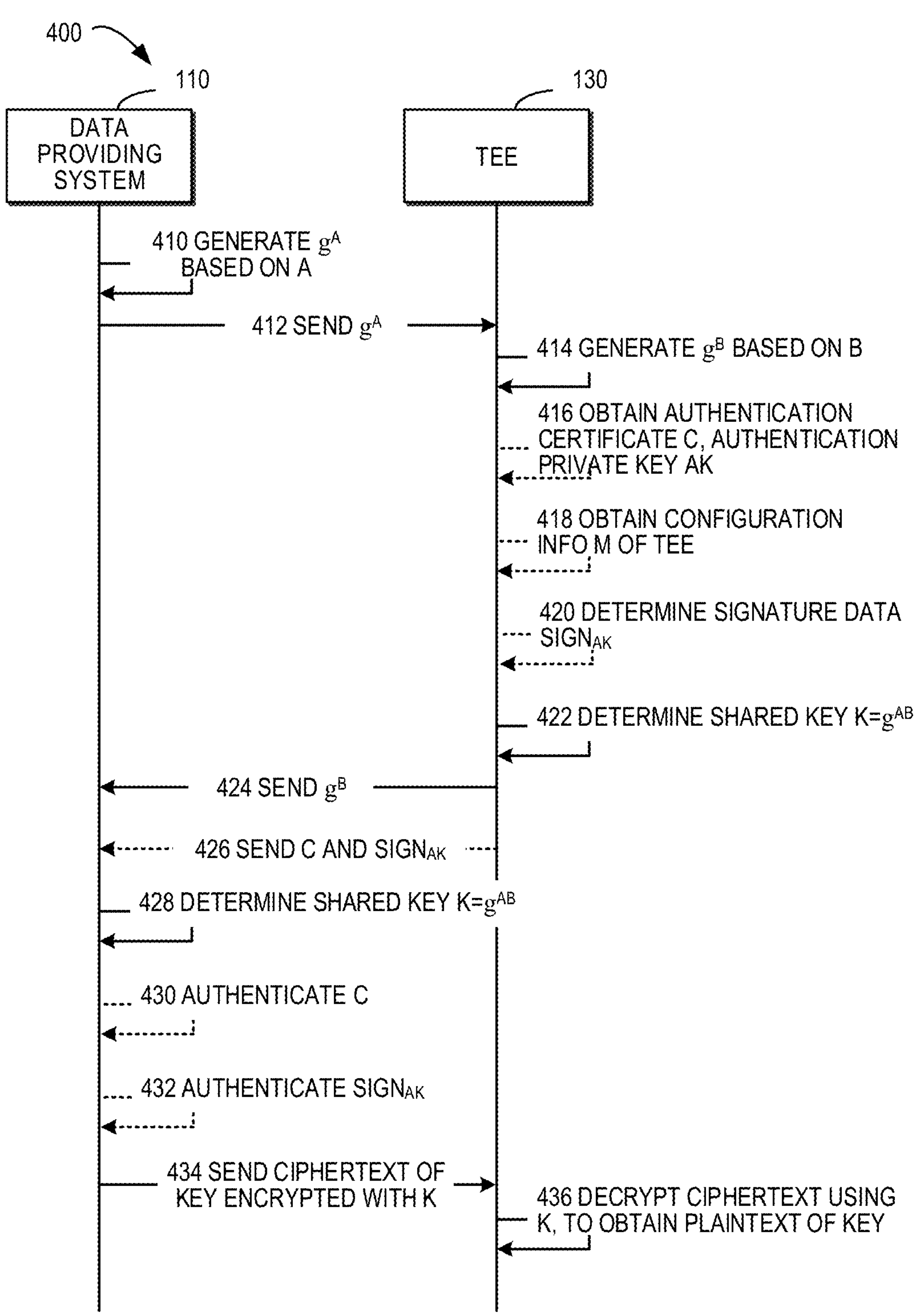
FIG. 4 illustrates a pipeline diagram of obtaining a key by a trusted execution environment via a secure channel according to some implementations of the present disclosure.

As described in FIG. 2, the trusted execution environment 130 may interaction with the data providing system 110 to obtain (218) the key 114. Specifically, the key 114 may be obtained via the secure channel 320 shown in FIG. 3. In the following, more information about establishing secure channel 320 and obtaining key 114 is described with reference to FIG. 4. FIG. 4 illustrates a pipeline diagram 400 of a process of obtaining a key 114 by a trusted execution environment 130 via a secure channel 320 in accordance with some implementations of the present disclosure. In the context of the present disclosure, the data providing system 110 may initiate a secret provisioning server to process the key exchange. Further, a dedicated program may be run in the trusted execution environment 130 to handle processes related to key exchange. Specifically, the secret provisioning server may wait for a request issued by the data processing system 120 for obtaining the key 114, and the dedicated program in the trusted execution environment 130 may send the request to the data providing system 110 when needed. Further, a secure channel may be established between the data providing system 110 and the trusted execution environment 130.

According to one example implementation of the present disclosure, the secure channel 320 may be established and the key exchange process may be completed based on a Diffie-Hellman Key Exchange (abbreviated as DKE) technique. In other words, the shared key may be determined in the data providing system 110 and the trusted execution environment 130. First, referring to the basic operation of the key exchange described in solid lines in FIG. 4, the secret provisioning server in the data provisioning system 110 may generate first data A (e.g., generated in a random manner) and generate (410) a first key $g^A$ based on the first data. $g^A$ may be sent (412) to the trusted execution environment 130. At this point, $g^A$ will be presented in the trusted execution environment 130. In the trusted execution environment 130, second data B may be generated (e.g., generated in a random manner), and the second key $g^B$ is generated (414) based on B.

Then, in the trusted execution environment 130, the shared key $K=g^{AB}$ may be determined (422) based on the received $g^A$ and the local B at the trusted execution environment 130. At this time, there is a shared key K in the trusted execution environment 130. According to an example implementation of the present disclosure, $g^B$ may be sent (424) to the data providing system 110, so that the data providing system 110 generates the shared key K of the secure channel via the local data A and the received data $g^B$. At this time, there will be local A, $g^A$ and $g^B$ in the data providing system 110 for generating the shared key K. In turn, the data providing system 110 may determine (428) the shared key $K=g^{AB}$ based on the local A and $g^B$. At this time, there is a shared key K locally in the data providing system 110. In other words, both parties of the key exchange have the shared key K, and then the shared key K be used to encrypt the key 114.

It will be appreciated that the shared keys K at the data provider system 110 and the trusted execution environment 130 are the same based on the DKE technology. Even if a third party obtains $g^A$ and $g^B$ during the data transmission process, the third party cannot obtain the shared key K due to the lack of data A and/or B. In this way, the security and integrity of the shared key may be improved, thereby ensuring that the genetic data processing process implemented based on the shared key is also secure. Hereinafter, a process of generating a shared key K locally in the data providing system 110 and the trusted execution environment 130 will be described.

In the context of the present disclosure, the processes described above may be performed based on an exponential operation and a modulo operation. For example, the modulus p and base b may be predefined, at which point the data providing system 110 may specify A and generate $g^A=b^A$ mod p (mod represents a modulo operation). At the trusted execution environment 130, B may be specified and $g^B=b^B$ mod p may be generated. In this case, the shared key $K=g^{AB}$ may be determined separately in the data providing system 110 and the trusted execution environment 130. Based on the DKE technique, the shared keys acquired at the two locations are the same. For example, at the data providing system 110 and the trusted execution environment 130, the shared key K may be determined based on Formulas 1 and 2, respectively:

$$K = g^{AB} = (g^A)^B = (b^A \bmod p)^B = b^{AB} \bmod p \quad \text{Formula 1}$$

$$K = g^{AB} = (g^B)^A = (b^B \bmod p)^A = b^{BA} \bmod p = b^{AB} \bmod p \quad \text{Formula 2}$$

In Formulas 1 and 2, K represents a shared key, A and B represents the data respectively generated at the data providing system 110 and the trusted execution environment 130, $g^A$ and $g^B$ respectively represents the keys generated at the data providing system 110 and the trusted execution environment 130 based on A and B, p represents a predefined modulus, and b represents a predefined base. It may be learned from Formulas 1 and 2 that the Formulas 1 and 2 are equal, that is, the shared keys K obtained at the data providing system 110 and the trusted execution environment 130 are the same. With example implementations of the present disclosure, the shared key K may be generated locally in the data providing system 110 and the trusted execution environment 130 in a secure and reliable manner for encrypting the key 114.

Further, the data providing system 110 may use $K=g^{AB}$ to encrypt the key 114 and send (434) the ciphertext of the key 114 to the trusted execution environment 130. At this time, in the trusted execution environment 130, the ciphertext encrypted with the shared key K may be received from the data providing system. Further, the dedicated program in the trusted execution environment 130 may decrypt (436) the received ciphertext by using the locally generated shared key $K=g^{AB}$ to obtain the plaintext of the key 114 (that is, obtain the key 124 shown in FIG. 1). In this case, the trusted execution environment 130 may have the key 124 in the plaintext format, and then the key 124 may be used to decrypt the ciphertext 126 of the genetic data in the trusted execution environment 130.

With the example implementation of the present disclosure, the key exchange is implemented based on the DEK, so that the same shared key is determined at the data providing system 110 and the trusted execution environment 130. Therefore the risk that the third party illegally obtains the shared key may be eliminated, and then the ciphertext 126 of the genetic data may be decrypted by using the shared key in the trusted execution environment 130.

Figure 5:
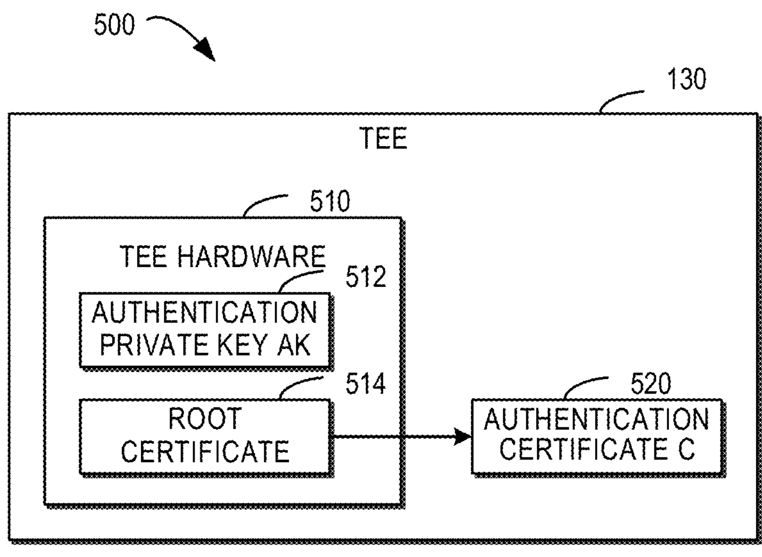
FIG. 5 illustrates a block diagram for determining an authentication certificate according to some implementations of the present disclosure.

According to an example implementation of the present disclosure, in order to further improve data security, an authentication step as shown by a dotted line in FIG. 4 may be added to the key exchange process. Specifically, the dedicated program in the trusted execution environment 130 may obtain (416) the authentication certificate C of the trusted execution environment 130 and the corresponding authentication private key AK. In the following, more details regarding the authentication process are described with reference to FIG. 5, which illustrates a block diagram 500 for determining the authentication certificate in accordance with some implementations of the present disclosure. As shown in FIG. 5, the trusted execution environment 130 may have dedicated TEE hardware 510, and the TEE hardware 510 may have its own authentication private key AK 512 that is not externally known. Further, the TEE hardware 510 may have its own root certificate 514, and the root certificate 514 may issue an authentication certificate C 520 corresponding to the authentication private key AK. At this point, the authentication process may be performed using the authentication private key AK 512 and the authentication certificate C 520.

Returning to FIG. 4, the authentication process is described with reference to the steps shown in dotted lines in FIG. 4. In the trusted execution environment 130, configuration information M of the trusted execution environment 130 may be obtained (418), and the configuration information M may comprise various information of the trusted execution environment 130, comprising but not limited to: a hardware and/or software configuration of the trusted execution environment 130, an application running in the trusted execution environment 130, and the like. It will be understood that although three steps as shown by dotted lines 416, 418, and 420 are shown in a sequential manner in FIG. 4, the above steps may be performed in different orders according to one example implementation of the present disclosure. For example, C may be obtained first, then AK and M may be obtained, and then $g^B$ may be generated, and so on.

According to an example implementation of the present disclosure, in the trusted execution environment 130, signatures for M, $g^A$, and $g^B$ may be determined based on the authentication private key AK. Specifically, the hash value HASH($g^A$, $g^B$) for $g^A$ and $g^B$ may be first determined, and the corresponding signature data $SIGN_{AK}(M, HASH(g^A, g^B))$ may be generated. Further, the authentication certificate M may be sent to the data providing system 110, so that the data providing system 110 authenticates the data processing system based on the authentication certificate C. In particular, the trusted execution environment 130 may send (426) the authentication certificate C and corresponding signature data $SIGN_{AK}$ to the data provisioning system 110, so that the data provisioning system 110 may utilize the authentication certificate C to validate the signature data $SIGN_{AK}$.

It will be appreciated that the configuration data M herein is used to inform the data provider system 110 of detailed information about the trusted execution environment 130. In this manner, the data providing system 110 may compare the configuration data M with expected data and check whether the data are consistent, so as to verify that the trusted execution environment 130 is a trusted environment in which the genetic data processing process is expected to be performed. Further, the data providing system 110 may confirm, based on the received hash value, whether the local $g^A$ and $g^B$ are consistent with $g^A$ and $g^B$ in the trusted execution environment 130. In this way, it may be ensured that the shared key K is generated based on the same $g^A$ and $g^B$ in both systems.

As shown by the dotted line in FIG. 4, the data providing system 110 may verify (430) the legitimacy of the authentication certificate C, and then verify (432) whether the signature data $SIGN_{AK}$ is legal using the verified authentication certificate C. If it is determined that the signature data $SIGN_{AK}$ is legal, it represents that the received $g^B$ is from the desired trusted execution environment 130 and is trusted, and thus $K=g^{AB}$, as determined locally at the data provider system 110, is also trusted. With example implementations of the present disclosure, the data providing system 110 may be verified to be communicating with the desired trusted execution environment 130 based on the authentication certificate C. In this way, the following situation may be prevented, in which the key 114 is spoofed by a malicious third party simulating the trusted execution environment 130.

According to an example implementation of the present disclosure, if the data providing system 110 confirms that the verification is successful, an indication may be sent to the trusted execution environment 130. The trusted execution environment 130 may receive the indication to confirm that a secure channel has been established between the trusted execution environment 130 and the data providing system 110. Thereafter, the key 114 may be transmitted in the secure channel, that is, the ciphertext of the key 114 encrypted by using the shared key K is transmitted. In this way, the key 124 may be obtained in the trusted execution environment 130.

The process of transferring the key 124 from the data providing system 110 to the trusted execution environment 130 by using the secure channel 320 has been described with reference to FIG. 4. In the following, subsequent processing of the genetic data is described with reference to FIG. 2. As shown in FIG. 2, in the trusted execution environment 130, the dedicated program may use the key 124 to decrypt the ciphertext 126 of the genetic data into the plaintext 122 of the genetic data. At this time, since the plaintext 122 of the genetic data is located in the trusted execution environment 130 and cannot be accessed by anyone, security and integrity of the genetic data may be ensured.

Further, in the trusted execution environment 130, a desired process may be utilized to process the plaintext 122 of the genetic data and obtain (222) a processing result. It will be understood that any desired processing process may be performed in the trusted execution environment 130, as long as the processing process is preloaded into the trusted execution environment 130. For example, genetic fragments may be found from genetic data that may lead to potential plant diseases and pests, and so on. With the example implementation of the present disclosure, the genetic data and the processing result in the trusted execution environment 130 are not visible to the outside, even the data processing system 120 cannot obtain any information in the trusted execution environment 130. In this way, the security in the genetic data processing process may be improved and the privacy of the processing process may be ensured.

According to an example implementation of the present disclosure, in the trusted execution environment 130, the processing result may be encrypted by using the key 124, so as to obtain (224) the ciphertext of the processing result. The ciphertext of the processing result may be written (226) to the data processing system 120, to further send (228) the ciphertext from the normal execution environment 140 in the data processing system 120 to the data providing system 110 via the public channel 310. After receiving the ciphertext from the data processing system 120, the data providing system 110 may decrypt the ciphertext using the key 114, so as to obtain (230) plaintext of the processing result, and the process of processing the genetic data is completed. In this process, the data providing system 110 may send the encrypted genetic data to the data processing system 120 in a completely confidential manner, and obtain the encrypted processing result.

With example implementations of the present disclosure, the plaintext of the genetic data and the processing result exists only in the data providing system 110 and the trusted execution environment 130. Since the data providing system 110 is the owner of the genetic data, storing the plaintext of the genetic data and processing results in the data providing system 110 does not result in leakage privacy data. Further, because nobody can access the data in the trusted execution environment 130, the plaintext of the genetic data and the processing result in the trusted execution environment 130 may be highly protected, and there is no risk of privacy data leakage.

Example Processes

Figure 6:
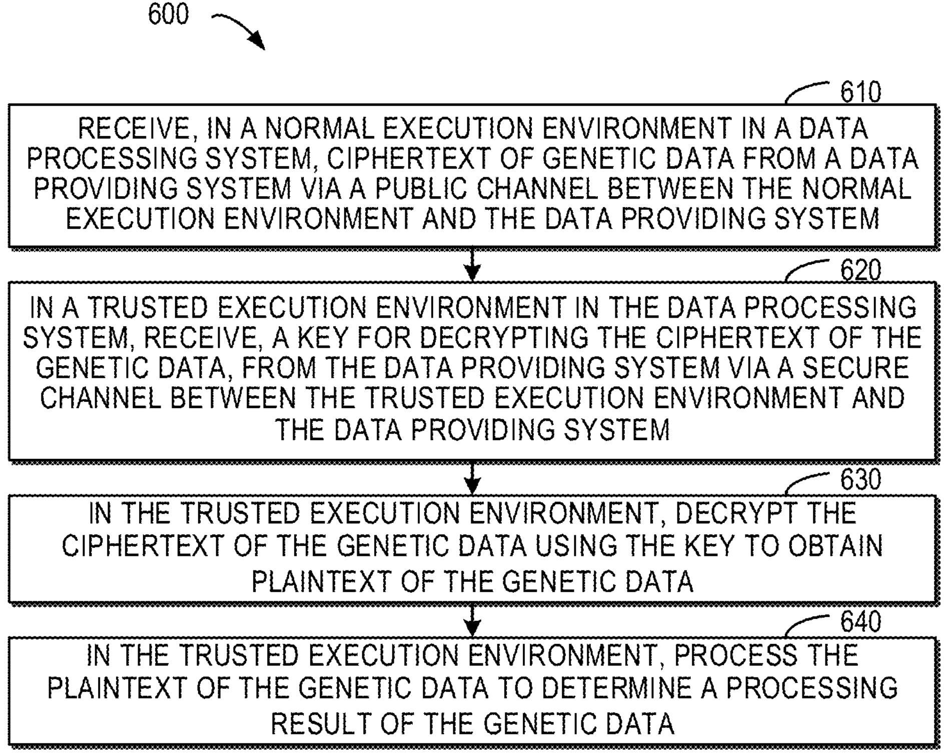
FIG. 6 illustrates a flowchart of a method for processing genetic data according to some implementations of the present disclosure.

FIG. 6 illustrates a flowchart of a method 600 for processing genetic data according to some implementations of the present disclosure. Specifically, at a block 610, in a normal execution environment in a data processing system, ciphertext of genetic data is received from a data providing system via a public channel between the normal execution environment and the data providing system. At a block 620, in a trusted execution environment in the data processing system, a key for decrypting the ciphertext of the genetic data is received from the data providing system via a secure channel between the trusted execution environment and the data providing system. At a block 630, in the trusted execution environment, the ciphertext of the genetic data is decrypted using the key to obtain plaintext of the genetic data. At a block 640, in the trusted execution environment, the plaintext of the genetic data is processed to determine a processing result of the genetic data.

According to an example implementation of the present disclosure, in the trusted execution environment, receiving from the data providing system a first key generated based on first data; and determining a shared key of the secure channel based on the first key and second data in the trusted execution environment.

According to an example implementation of the present disclosure, in the trusted execution environment, sending the second key to the data providing system, so that the data providing system generates the shared key of the secure channel via the first data and the received second key.

According to an example implementation of the present disclosure, generating, in the trusted execution environment and based on a root certificate of the trusted execution environment, an authentication certificate associated with an authentication private key of the trusted execution environment; and sending the authentication certificate to the data providing system, so that the data providing system authenticates the data processing system based on the authentication certificate.

According to an example implementation of the present disclosure, in the trusted execution environment, determining configuration information of the trusted execution environment and signature data of a hash value associated with the first key and the second key based on the authentication private key; and sending the signature data to the data providing system so that the data providing system authenticates the data processing system based on the authentication certificate and the signature data.

According to an example implementation of the present disclosure, in the trusted execution environment, receiving an indication from the data providing system, the indication being sent in response to the data providing system successfully authenticating the data processing system; and confirming that the secure channel is established between the trusted execution environment and the data providing system based on the indication.

According to an example implementation of the present disclosure, receiving the key via the secure channel comprises: in the trusted execution environment, receiving ciphertext of the key from the data providing system, the ciphertext of the key being encrypted using the shared key; and decrypting the received ciphertext of the key using the shared key to obtain plaintext of the key.

According to an example implementation of the present disclosure, obtaining the plaintext of the genetic data comprises: loading the ciphertext of the genetic data from the normal execution environment to the trusted execution environment; and in the trusted execution environment, decrypting the ciphertext of the genetic data using the plaintext of the key to obtain the plaintext of the genetic data.

According to an example implementation of the present disclosure, in the trusted execution environment, encrypting the processing result using the key to form ciphertext of the processing result; writing the ciphertext of the processing result to the normal execution environment from the trusted execution environment; and in the normal execution environment, sending the ciphertext of the processing result to the data providing system via the public channel.

Example Apparatus and Device

Figure 7:
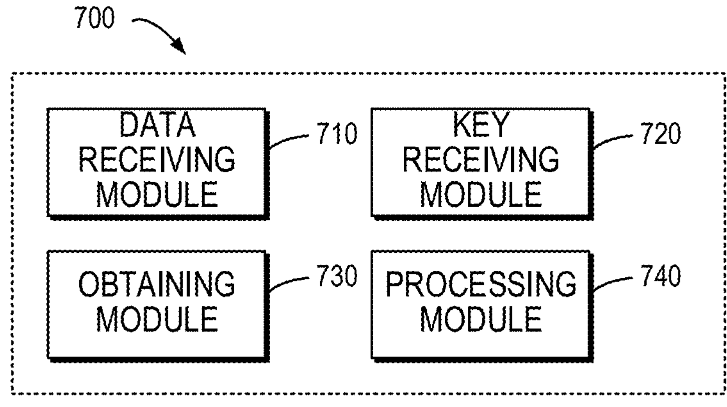
FIG. 7 illustrates a block diagram of an apparatus for processing genetic data according to some implementations of the present disclosure.

FIG. 7 shows a block diagram of an apparatus 700 for processing genetic data according to some implementations of the present disclosure. The apparatus 700 comprises: a data receiving module 710, configured for receiving, in a normal execution environment in a data processing system, ciphertext of genetic data from a data providing system via a public channel between the normal execution environment and the data providing system; a key receiving module 720, configured for in a trusted execution environment in the data processing system, receiving, a key for decrypting the ciphertext of the genetic data, from the data providing system via a secure channel between the trusted execution environment and the data providing system; an obtaining module 730, configured for decrypting, in the trusted execution environment, the ciphertext of the genetic data using the key to obtain plaintext of the genetic data; and a processing module 740, configured for processing, in the trusted execution environment, the plaintext of the genetic data to determine a processing result of the genetic data.

According to an example implementation of the present disclosure, the apparatus 700 further comprises: a channel key receiving module, configured for receiving, in the trusted execution environment, from the data providing system a first key generated based on first data; and a channel key determining module, configured for determining, in the trusted execution environment, a shared key of the secure channel based on the first key and second data in the trusted execution environment.

According to an example implementation of the present disclosure, the apparatus 700 further comprises: a channel key sending module, configured for sending, in the trusted execution environment, the second key to the data providing system, so that the data providing system generates the shared key of the secure channel via the first data and the received second key.

According to an example implementation of the present disclosure, the apparatus 700 further comprises: a certificate generating module, configured for generating, in the trusted execution environment and based on a root certificate of the trusted execution environment, an authentication certificate associated with an authentication private key of the trusted execution environment; and a certificate sending module, configured for sending, in the trusted execution environment, the authentication certificate to the data providing system, so that the data providing system authenticates the data processing system based on the authentication certificate.

According to an example implementation of the present disclosure, the apparatus 700 further comprises: a signature determining module, configured for determining, in the trusted execution environment and based on the authentication private key, configuration information of the trusted execution environment and signature data of a hash value associated with the first key and the second key; and a signature sending module, configured for sending, in the trusted execution environment, the signature data to the data providing system so that the data providing system authenticates the data processing system based on the authentication certificate and the signature data.

According to an example implementation of the present disclosure, the apparatus 700 further comprises: an indication receiving module, configured for receiving, in the trusted execution environment, an indication from the data providing system, the indication being sent in response to the data providing system successfully authenticating the data processing system; and an establishing module, configured for confirming, in the trusted execution environment and based on the indication, that the secure channel is established between the trusted execution environment and the data providing system.

According to an example implementation of the present disclosure, the channel key receiving module comprises: a key ciphertext receiving module, configured for receiving, in the trusted execution environment, ciphertext of the key from the data providing system, the ciphertext of the key being encrypted using the shared key; and a key plaintext determining module, configured for decrypting, in the trusted execution environment, the received ciphertext of the key using the shared key to obtain plaintext of the key.

According to an example implementation of the present disclosure, obtaining module 730 comprises: a loading module, configured for loading the ciphertext of the genetic data from the normal execution environment to the trusted execution environment; and a decrypting module, configured for decrypting, in the trusted execution environment, the ciphertext of the genetic data using the plaintext of the key to obtain the plaintext of the genetic data.

According to an example implementation of the present disclosure, the apparatus 700 further comprises: a result encrypting module, configured for encrypting, in the trusted execution environment, the processing result using the key to form ciphertext of the processing result; a result writing module, configured for writing the ciphertext of the processing result to the normal execution environment from the trusted execution environment; and a result sending module, configured for sending, in the normal execution environment, the ciphertext of the processing result to the data providing system via the public channel.

Figure 8:
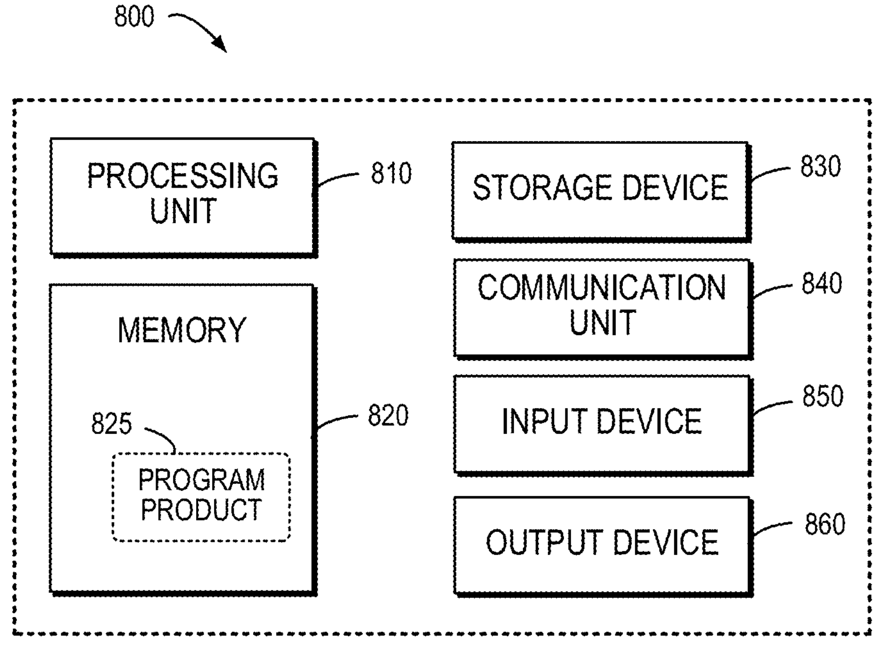
FIG. 8 illustrates a block diagram of a device capable of implementing various implementations of the present disclosure.

FIG. 8 illustrates a block diagram of a device 800 that can implement a plurality of implementations of the present disclosure. It should be understood that the computing device 800 shown in FIG. 8 is only exemplary and shall not constitute any limitation on the functions and scope of the implementations described herein. The computing device 800 shown in FIG. 8 can be used to implement the method described above.

As shown in FIG. 8, the computing device 800 is in the form of a general purpose computing device. Components of the computing device 800 may include, but are not limited to, one or more processors or processing units 810, a memory 820, a storage device 830, one or more communication units 840, one or more input devices 850, and one or more output devices 860. The processing unit 810 may be a physical or virtual processor and may execute various processing based on the programs stored in the memory 820. In a multi-processor system, a plurality of processing units executes computer-executable instructions in parallel to enhance parallel processing capability of the computing device 800.

The computing device 800 usually includes a plurality of computer storage mediums. Such mediums may be any attainable medium accessible by the computing device 800, including but not limited to, a volatile and non-volatile medium, a removable and non-removable medium. The memory 820 may be a volatile memory (e.g., a register, a cache, a Random Access Memory (RAM)), a non-volatile memory (such as, a Read-Only Memory (ROM), an Electrically Erasable Programmable Read-Only Memory (EEPROM), flash), or any combination thereof. The storage device 830 may be a removable or non-removable medium, and may include a machine-readable medium (e.g., a memory, a flash drive, a magnetic disk) or any other medium, which may be used for storing information and/or data (e.g., training data for training) and be accessed within the computing device 800.

The computing device 800 may further include additional removable/non-removable, volatile/non-volatile storage mediums. Although not shown in FIG. 10, there may be provided a disk drive for reading from or writing into a removable and non-volatile disk (e.g., "floppy disk") and an optical disc drive for reading from or writing into a removable and non-volatile optical disc. In such cases, each drive may be connected to a bus (not shown) via one or more data medium interfaces. The memory 820 may include a computer program product 825 having one or more program modules, and these program modules are configured for performing various methods or acts of various implementations of the present disclosure.

The communication unit 840 implements communication with another computing device via a communication medium. Additionally, functions of components of the computing device 800 may be realized by a single computing cluster or a plurality of computing machines, and these computing machines may communicate through communication connections. Therefore, the computing device 800 may operate in a networked environment using a logic connection to one or more other servers, a Personal Computer (PC) or a further general network node.

The input device 850 may be one or more various input devices, such as a mouse, a keyboard, a trackball, a voice-input device, and the like. The output device 860 may be one or more output devices, e.g., a display, a loudspeaker, a printer, and so on. The computing device 800 may also communicate through the communication unit 840 with one or more external devices (not shown) as required, where the external device, e.g., a storage device, a display device, and so on, communicates with one or more devices that enable users to interact with the computing device 800, or with any device (such as a network card, a modem, and the like) that enable the computing device 800 to communicate with one or more other computing devices. Such communication may be executed via an Input/Output (I/O) interface (not shown).

According to the example implementations of the present disclosure, a computer-readable storage medium is provided, on which computer-executable instructions are stored, wherein the computer-executable instructions are executed by a processor to implement the method described above. According to the example implementations of the present disclosure, a computer program product is further provided, which is tangibly stored on a non-transient computer-readable medium and includes computer-executable instructions, which are executed by a processor to implement the method described above. According to the example implementations of the present disclosure, a computer program product is provided, storing a computer program thereon, the program, when executed by a processor, implementing the method described above.

Aspects of the present disclosure are described herein with reference to flowchart illustrations and/or block diagrams of methods, apparatus (systems), and computer program products according to implementations of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present disclosure have been presented for purposes of illustration, but are not intended to be exhaustive or limited to implementations disclosed. Many modifications and variations will be apparent to those of ordinary skill in the art without departing from the scope and spirit of the described implementations. The terminology used herein was chosen to best explain the principles of implementations, the practical application or technical improvement over technologies found in the marketplace, or to enable others of ordinary skill in the art to understand implementations disclosed herein.

The invention claimed is:

1. A method for processing genetic data, comprises:

receiving, in a normal execution environment in a data processing system, ciphertext of genetic data from a data providing system via a public channel between the normal execution environment and the data providing system;

in a trusted execution environment in the data processing system, receiving, a key for decrypting the ciphertext of the genetic data, from the data providing system via a secure channel between the trusted execution environment and the data providing system;

decrypting the ciphertext of the genetic data using the key to obtain plaintext of the genetic data;

processing the plaintext of the genetic data to determine a processing result of the genetic data;

receiving from the data providing system a first key generated based on first data; and determining a shared key of the secure channel based on the first key and second data in the trusted execution environment.

2. The method of claim 1, further comprising: in the trusted execution environment, sending the second key to the data providing system, so that the data providing system generates the shared key of the secure channel via the first data and the received second key.

3. The method of claim 2, further comprising: in the trusted execution environment, generating, based on a root certificate of the trusted execution environment, an authentication certificate associated with an authentication private key of the trusted execution environment; and sending the authentication certificate to the data providing system, so that the data providing system authenticates the data processing system based on the authentication certificate.

4. The method of claim 3, further comprising: in the trusted execution environment, determining configuration information of the trusted execution environment and signature data of a hash value associated with the first key and the second key based on the authentication private key; and sending the signature data to the data providing system so that the data providing system authenticates the data processing system based on the authentication certificate and the signature data.

5. The method of claim 4, further comprising: in the trusted execution environment, receiving an indication from the data providing system, the indication being sent in response to the data providing system successfully authenticating the data processing system; and confirming that the secure channel is established between the trusted execution environment and the data providing system based on the indication.

6. The method of claim 1, wherein receiving the key via the secure channel comprises: in the trusted execution environment, receiving ciphertext of the key from the data providing system, the ciphertext of the key being encrypted using the shared key; and decrypting the received ciphertext of the key using the shared key to obtain plaintext of the key.

7. The method of claim 6, wherein obtaining the plaintext of the genetic data comprises:

loading the ciphertext of the genetic data from the normal execution environment to the trusted execution environment; and in the trusted execution environment, decrypting the ciphertext of the genetic data using the plaintext of the key to obtain the plaintext of the genetic data.

8. The method of claim 1, further comprising:

in the trusted execution environment, encrypting the processing result using the key to form ciphertext of the processing result;

writing the ciphertext of the processing result to the normal execution environment from the trusted execution environment; and in the normal execution environment, sending the ciphertext of the processing result to the data providing system via the public channel.

9. An electronic device comprises:

at least one processing unit; and at least one memory coupled to the at least one processing unit and storing instructions executed by the at least one processing unit, the instructions, when executed by the at least one processing unit, causing the electronic device to perform a method for processing genetic data, comprising:

receiving, in a normal execution environment in a data processing system, ciphertext of genetic data from a data providing system via a public channel between the normal execution environment and the data providing system;

in a trusted execution environment in the data processing system, receiving, a key for decrypting the ciphertext of the genetic data, from the data providing system via a secure channel between the trusted execution environment and the data providing system;

decrypting the ciphertext of the genetic data using the key to obtain plaintext of the genetic data;

processing the plaintext of the genetic data to determine a processing result of the genetic data;

receiving from the data providing system a first key generated based on first data; and determining a shared key of the secure channel based on the first key and second data in the trusted execution environment.

10. The electronic device of claim 9, wherein the method further comprises: in the trusted execution environment, sending the second key to the data providing system, so that the data providing system generates the shared key of the secure channel via the first data and the received second key.

11. The electronic device of claim 10, wherein the method further comprises: in the trusted execution environment, generating, based on a root certificate of the trusted execution environment, an authentication certificate associated with an authentication private key of the trusted execution environment; and sending the authentication certificate to the data providing system, so that the data providing system authenticates the data processing system based on the authentication certificate.

12. The electronic device of claim 11, wherein the method further comprises: in the trusted execution environment, determining configuration information of the trusted execution environment and signature data of a hash value associated with the first key and the second key based on the authentication private key; and sending the signature data to the data providing system so that the data providing system authenticates the data processing system based on the authentication certificate and the signature data.

13. The electronic device of claim 12, wherein the method further comprises: in the trusted execution environment, receiving an indication from the data providing system, the indication being sent in response to the data providing system successfully authenticating the data processing system; and confirming that the secure channel is established between the trusted execution environment and the data providing system based on the indication.

14. The electronic device of claim 9, wherein receiving the key via the secure channel comprises: in the trusted execution environment, receiving ciphertext of the key from the data providing system, the ciphertext of the key being encrypted using the shared key; and decrypting the received ciphertext of the key using the shared key to obtain plaintext of the key.

15. The electronic device of claim 14, wherein obtaining the plaintext of the genetic data comprises:

loading the ciphertext of the genetic data from the normal execution environment to the trusted execution environment; and in the trusted execution environment, decrypting the ciphertext of the genetic data using the plaintext of the key to obtain the plaintext of the genetic data.

16. The electronic device of claim 9, wherein the method further comprises:

in the trusted execution environment, encrypting the processing result using the key to form ciphertext of the processing result;

writing the ciphertext of the processing result to the normal execution environment from the trusted execution environment; and in the normal execution environment, sending the ciphertext of the processing result to the data providing system via the public channel.

17. A non-transitory computer-readable storage medium, storing a computer program thereon, the computer program, when executed by a processor, causing the processor to implement a method for processing genetic data, comprising:

receiving, in a normal execution environment in a data processing system, ciphertext of genetic data from a data providing system via a public channel between the normal execution environment and the data providing system;

in a trusted execution environment in the data processing system, receiving, a key for decrypting the ciphertext of the genetic data, from the data providing system via a secure channel between the trusted execution environment and the data providing system;

decrypting the ciphertext of the genetic data using the key to obtain plaintext of the genetic data;

processing the plaintext of the genetic data to determine a processing result of the genetic data;

receiving from the data providing system a first key generated based on first data; and determining a shared key of the secure channel based on the first key and second data in the trusted execution environment.

* * * * *